UNITED STATES PATENT OFFICE.

JAMES CLEGG, OF LONDON, ENGLAND.

ELECTRIC-LIGHT CARBON.

SPECIFICATION forming part of Letters Patent No. 487,046, dated November 29, 1892.

Application filed April 10, 1890. Serial No. 347,390. (No specimens.)

*To all whom it may concern:*

Be it known that I, JAMES CLEGG, a subject of the Queen of Great Britain, residing at Connaught Mansions, Victoria Street, in the city of Westminster, London, England, have invented certain new and useful Improvements in the Manufacture of Light Emitters or Illuminants for Electric or other Lamps, of which the following is a specification.

The present invention relates particularly to the manufacture of incandescent bodies—such as incandescent filaments—used in electric incandescent lamps.

My invention consists in treating such incandescent bodies or filaments with certain metallic compounds in a manner hereinafter described, whereby they are made more durable and effective, and so that with the same consumption of electric energy they are made to emit a far greater quantity of light.

In carrying out my invention volatile fluids are used in which oxides, salts, or other compounds of certain metals are dissolved or suspended.

The volatile fluids may be prepared as a vehicle for metal haloid salts in the following manner: Iodine is dissolved in alcohol, or the alcohol is saturated with chlorine, and then the metal is dissolved in this fluid, or else the metal is dissolved in bromine and the solution is mixed with alcohol. The oxides and salts of metals, and in particular the combinations thereof with organic acids—such, for instance, as acetate of magnesium—may also be dissolved in alcohol, or if they are not soluble they may be held in suspension in the alcohol in a state of very fine distribution. These solutions are made specially suitable by boiling them for several hours in a retort provided with a backflow-cooler, which is kept sufficiently cool in order to avoid too high a tension in the retort. Instead of alcohol, other volatile solutions can also be used, such as benzine or ether, although alcohol is as a rule to be preferred, it being cheaper, and, as compared with many other volatile fluids, the more effective. When the volatile fluid has been prepared in the manner above described, a certain quantity of it is poured into the lower part of a vessel, which is connected with a second vessel, in which a vacuum or a partial vacuum is produced by means of a pump or in some other suitable manner. In this vessel containing the fluid, but at some distance above the fluid, the incandescent body to be treated is hung. When the air has been pumped out of the vessel and through the diminution of the pressure, the evaporation of the volatile fluid (which can still further be promoted by heating from the outside) has commenced, an electric current is sent through the suspended incandescent body in order to bring it up to a glow heat, whereby in a very short time there is produced upon it a precipitation from the metallic compound carried off by the vapors of the volatile fluid.

Instead of removing the air from the vessel by placing it in communication with an evacuated space, it can also be expelled by boiling the volatile fluid in the vessel; but in that way a portion of the fluid is lost, and as, moreover, the air cannot be entirely expelled there is the risk of an explosion when the incandescent body or light filament is heated. For treating the incandescent body in the manner above described almost any desired metal can be used, with the exception of those which are volatilized at the high temperatures which the incandescent bodies receive. Thus, for instance, zinc, sodium, or potassium could not be used. Metals like magnesium, calcium, chromium, manganese, and a number of rarer metals—such as zirconium, thorinum, and lanthanum—give the best results. Some metals which in and by themselves cannot be used can be used in compounds. Thus, for instance, iron, which cannot be used by itself, can be used in combination with aluminium. Finely-broken-up silicas can also be used in the same way as insoluble metallic oxides. For treatment in the manner above described any of the incandescent bodies ordinarily in use and consisting for the most part of carbon in some form can be used. The metallic substance which is precipitated upon the incandescent bodies according to this process may, if it be deposited in the form of an oxide or salt, be more or less decomposed or reduced by contact with the highly-heated carbon, or the metal may enter more or less into combination with the carbon. Whatever the result may be from a chemical point of view, the incandescent body is not only by this treatment made more durable than incandescent bodies which have not been treated in this manner, but it also becomes more effective than other incandescent bodies—that is to say, if it be heated in a bell empty of air it emits with a given consumption of electric energy far more light, as will be shown by the following examples, which represent the results of experiments which were made with incandescent bodies before and after being treated according to this process. A carbon filament which before treatment required 4.25 watts of electric energy for every candle consumed after treatment with iodide of magnesium only 2.2 watts per candle. Another carbon filament prepared in a different way, which before treatment required 3.4 watts for every candle, required after treatment with iodide of magnesium only 1.77 watts per candle. A large number of other experiments gave similar results. Another noteworthy feature which was shown by these experiments is that the incandescent bodies treated according to the above-described process, even within wide limits of temperature, only experience a very slight change in resistance, which change is far slighter than is the case with incandescent bodies which have not been treated in this manner. For instance, an electro-motive force of forty to sixty-seven volts was used with incandescent bodies which had been treated by the above-described process and which possessed an illuminating power of twenty to two hundred and forty candles, and it was found that the resistance only varied from 29.6 to 30.8 ohms.

I claim as my invention—

1. In the manufacture of light emitters or illuminants for electric lamps, the herein-described treatment of carbon filaments to cause a deposit on them of metallic matter, which consists in electrically heating them to incandescence while they are suspended in a vessel from which all air or oxidizing vapor is excluded above a volatile liquid, such as alcohol having dissolved or suspended in it a haloid or acid salt or an oxide of some one or more suitable metals.

2. The herein-described improvement in the manufacture of incandescent bodies or filaments for electric lamps, which consists in heating to a glow by an electric current a carbon filament in vacuum over a volatile fluid, such as alcohol containing a non-volatile substance, such as a haloid or acid salt, or an oxide of some one or more suitable metals, volatilizing the fluid and causing the non-volatile substance to be carried to and deposited upon the carbon filament.

JAMES CLEGG.

Witnesses:
FREDERICK SPANSWICK,
24 Southampton Buildings, London.
T. F. BARNES,
28 Southampton Buildings, London.